United States Patent
Bailey

Patent Number: 5,718,864
Date of Patent: Feb. 17, 1998

[54] THERMOSETTING RESIN TRANSFER MOLDING PROCESS

[75] Inventor: Francis V. Bailey, Racine, Wis.

[73] Assignee: Outboard Marine Corporation, Waukegan, Ill.

[21] Appl. No.: 418,568

[22] Filed: Apr. 7, 1995

[51] Int. Cl.$^6$ .................................................. B29C 45/74
[52] U.S. Cl. .......................... 264/328.4; 264/328.15
[58] Field of Search .......................... 264/328.4, 328.5, 264/328.2, 328.6, 328.15

[56] References Cited

U.S. PATENT DOCUMENTS

| | | | |
|---|---|---|---|
| 3,819,312 | 6/1974 | Arpajian | 425/543 |
| 4,309,379 | 1/1982 | Dannels et al. | 264/328.2 |
| 4,444,704 | 4/1984 | Hira et al. | 264/328.6 |
| 4,447,386 | 5/1984 | Dannels et al. | 264/328.2 |
| 4,894,197 | 1/1990 | Tsutsumi | 264/297.2 |
| 4,955,804 | 9/1990 | Martell et al. | 425/548 |
| 5,068,065 | 11/1991 | Maus et al. | 264/1.3 |
| 5,096,410 | 3/1992 | Loulourgas | 425/547 |
| 5,187,001 | 2/1993 | Brew | 264/328.6 |
| 5,445,781 | 8/1995 | Addeo et al. | 264/328.6 |

FOREIGN PATENT DOCUMENTS 2446729  4/1976  Germany ............................ 264/328.6

OTHER PUBLICATIONS

Emmerich, Anthony, "Liquid Injection Molding: Where It Stands Today", Plastics Technology, pp. 91–96, Apr. 1980.

*Primary Examiner*—Jill L. Heitbrink
*Attorney, Agent, or Firm*—Jones, Day, Reavis & Pogue

[57] ABSTRACT

A method of resin transfer molding with a thermoset resin material and including the steps of forming a mold defining a cavity, communicating a hollow sprue with the mold cavity, filling the mold cavity and the sprue with unpolymerized resin and catalyst mixture under pressure, refrigerating the sprue adjacent to the mold cavity so as to delay polymerization of the resin in the sprue to maintain a pressure path through the sprue to the mold cavity during the continued application of pressurized mixture to the sprue, and maintaining the refrigerating of the mixture in the sprue until after at least commencement of polymerization of the resin in the mold cavity to form a molded part.

3 Claims, 1 Drawing Sheet

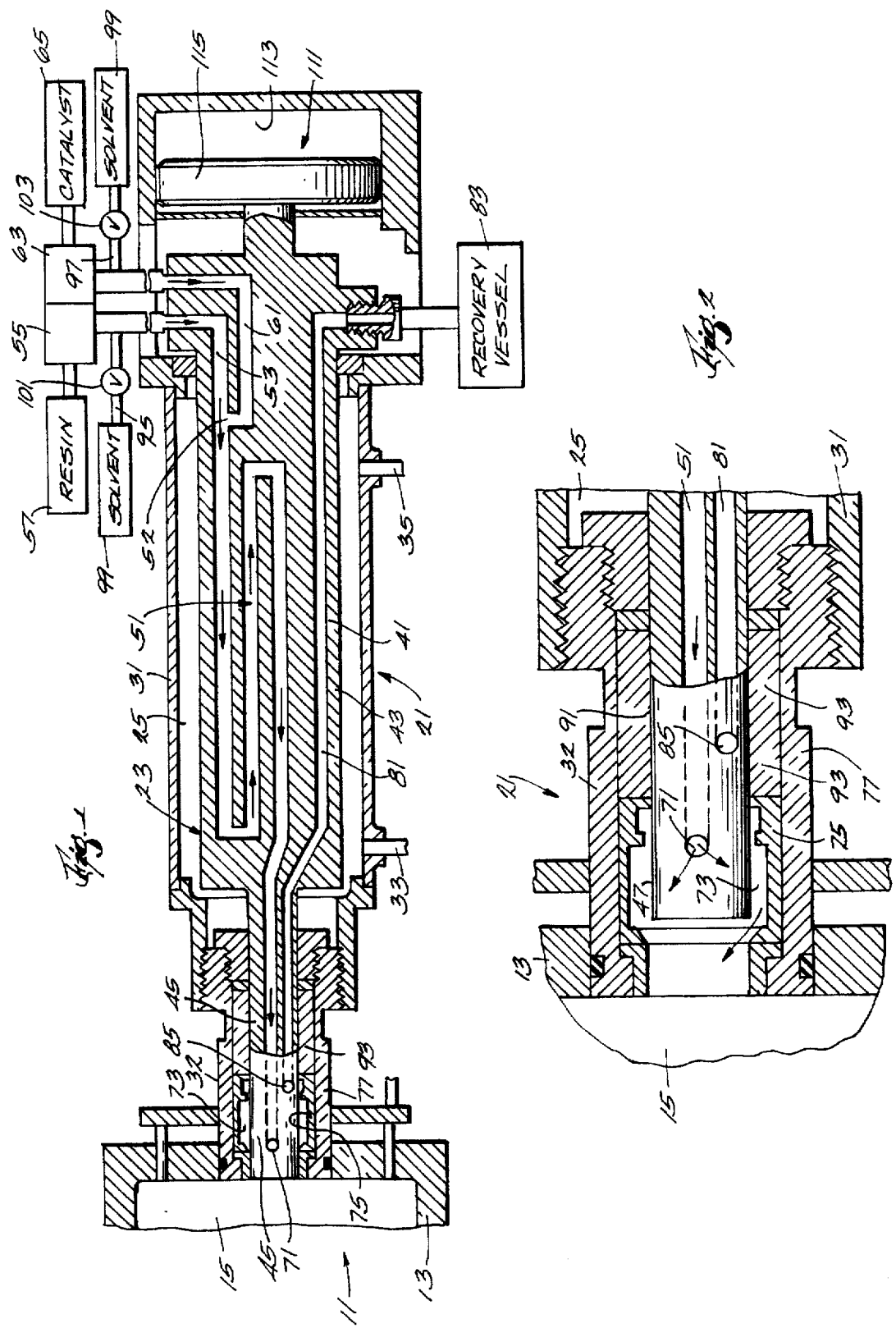

5,718,864

THERMOSETTING RESIN TRANSFER MOLDING PROCESS

BACKGROUND OF THE INVENTION

The invention relates generally to plastic molding and, more particularly, to resin transfer molding wherein a thermoset resin material is prepared and pumped into the mold.

It is known in the art that reducing the temperature of a thermoset resin will slow the polymerization process.

Attention is directed to the following U.S. Pat. Nos.:

3,819,312—Issued Jun. 25, 1974

4,309,379—Issued Jan. 5, 1982

4,894,197—Issued Jan. 16, 1990

4,955,804—Issued Sep. 11, 1990

SUMMARY OF THE INVENTION

The invention provides a method of resin transfer molding with a thermoset resin material and including the steps of forming a mold defining a cavity, communicating a hollow sprue with the mold cavity, filling the mold cavity and the sprue with unpolymerized resin and catalyst mixture under pressure, refrigerating the sprue adjacent to the mold cavity so as to delay polymerization of the resin in the sprue to maintain a pressure path through the sprue to the mold cavity during the continued application of pressurized mixture to the sprue, and maintaining said refrigerating of the mixture in the sprue until after at least commencement of polymerization of the resin in the mold cavity to form a molded part.

The invention also provides molding apparatus comprising a mold defining a mold cavity, a sprue moveable relative to the mold cavity between an open position and a closed position and including a resin and catalyst mixture flow passage adapted to communicate with a pressurized source of resin and a pressurized source of catalyst, which mixture flow passage communicates with the mold cavity when the sprue is in the open position, and is out of communication with the mold cavity when the sprue is in the closed position, and means for refrigerating the mixture passage.

The invention also provides molding apparatus comprising a mold defining a mold cavity, a sleeve fixed relative to the mold and defining an inner space which is communicable with the mold cavity, a sprue moveable relative to the mold cavity between open and closed positions and including a stem portion extending in the sleeve, located to block communication between the space and the mold cavity when the sprue is in the closed position and located to afford communication between the space and the mold cavity when the sprue is in the open position, a resin and catalyst mixture flow passage including an inlet end, and an outlet port located in the stem portion and communicating with the space when the sprue is in both the open and closed positions, and a flushing passage adapted to communicate with a remote recovery vessel and including a port which is located in the stem portion, which communicates with the space when the sprue is in the closed position, and which is out of communication with the space when the sprue is in the open position, a pressurized resin supply conduit communicating with the inlet end of the mixture passage and adapted to communicate with a pressurized source of resin, a pressurized catalyst supply conduit communicating with the inlet end of the mixture passage and with a pressurized source of catalyst, solvent supply passages adapted to communicate with a source of solvent, respectively communicating with the resin supply conduit and with the catalyst supply conduit, and respectively including therein flow controlling valves, means for cooling the mixture passage including the inlet end, and means for displacing the sprue between the open and closed positions.

Other features and advantages of the invention will become apparent to those skilled in the art upon review of the following detailed description, claims and drawings.

DESCRIPTION OF THE DRAWINGS

FIG. 1 is a fragmentary sectional view of apparatus for refrigerating resin in the sprue during molding of plastic parts, with the sprue shown in the closed position.

FIG. 2 is an enlarged fragmentary sectional view of a portion of the apparatus shown in FIG. 1 with the sprue shown in the open position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Illustrated schematically in the drawing is a mold 11 including a mold member 13 at least partially defining a mold cavity 15, and a sprue assembly 21 which communicates with the mold cavity 15 and through which unpolymerized (liquid) resin mixed with catalyst is inserted (supplied) to the mold cavity 15.

More particularly, as shown in FIG. 1, the sprue assembly 21 includes a sprue 23 and a surrounding coolant jacket 25. More particularly, the cooling jacket 25 is defined by a jacket structure 31 which can be of any suitable construction, which surrounds the sprue 23, which is fixed to the mold 11 by a suitable connecting structure 32, and which includes an inlet port 33 which facilitates coolant flow into the cooling jacket 25 from a suitable refrigerating device (not shown) and an outlet port 35 which facilitates return flow of coolant to the refrigerating device. Any suitable piping arrangement and refrigerating device can be used to supply the cooling jacket 25 with coolant. In addition, any suitable coolant can be used.

The sprue 23 includes a housing 41 defined by a main body portion 43 and a stem portion 45 which extends from the main body portion 43 and into the connecting structure, 32 and which includes a cylindrical periphery 47. The stem portion 45 and the main body portion 43 include therein a resin and catalyst mixing flow passage or pipe 51 which includes an inlet end 52 located in the main body portion 43 and in spaced relation from the stem portion 45. The inlet end 52 communicates with a resin supply conduit 53 including a suitable pump 55 which can be of the positive displacement type and which communicates with a suitable resin source 57. Also at the same inlet end 52, the mixing pipe or passage 51 communicates with a catalyst supply conduit 61 including a suitable pump 63 which can be of the positive displacement type and which communicates with a suitable source of catalyst 65. It is noted that the resin supply conduit 53 and the catalyst supply conduit 61 join to form the resin and catalyst mixing passage or pipe 51 in a portion of the main body portion 43 within the refrigerated area of the sprue 23, i.e., within the area surrounded by the cooling jacket 25.

At the other end thereof, the resin and catalyst mixing passage or pipe 51 terminates in an outlet port 71 which is located in the outer periphery 47 of the sprue stem portion 45, and which communicates with an interior annular space or volume 73 of a sleeve or annular member 75 which is fixedly located within an annular member 77 which forms part of the connecting structure 32 and which extends from the coolant jacket structure 31.

The sprue 23 is axially displaceable relative to the cooling jacket 25 and the sleeve 75 between an open position (see FIG. 2) affording flow of resin and catalyst mixture out of the sprue 23 and into the mold cavity 15 and a closed position (see FIG. 1) preventing flow into the mold cavity 15. More specifically, the interior space 73 of the sleeve 75 communicates with the mold cavity 15 when the stem portion 45 is in the open position as shown in FIG. 2, and is closed from or out of communication with the mold cavity 15 when the stem portion 45 is in the closed position, as shown in FIG. 1.

The sprue assembly 21 also includes means for flushing the sprue 23. While other constructions can be employed, in the disclosed construction, the sprue 23 includes a flushing passage 81 which, at one end, communicates with a recovery vessel 83 for reclaiming solvent and which, at the other end, includes a port 85 which is located in the outer periphery 47 of the stem portion 45 in axially inwardly spaced relation to the mixture outlet port 71 such that, when the sprue 23 is in the open position (see FIG. 2), the port 85 is closed off by an inner cylindrical wall 91 of another sleeve or annular member 93 which forms part of the connecting structure 32 and which extends axially from the jacket structure 31 in radially inwardly adjacent relation to the annular member 77. When the sprue 23 is in the closed position, the port 85 is located for communication with the annular space 73 of the sleeve 75 and, hence, with the resin outlet port 71. The sleeve or annular member 93 also engages the stem portion 45 of the sprue 23 to guide sprue movement between the open and closed sprue positions.

Means are also provided for displacing the sprue 23 between the open and closed positions. While other arrangements can be employed, in the disclosed construction, such means comprises a pneumatic or hydraulic ram 111 which includes a cylinder 113 fixed to the jacket structure 31 and a moveable member or piston 115 fixed to the sprue 23. Any suitable means can be employed to operate the ram 111.

Solvent is supplied for flushing through first and second solvent supply pipes 95 and 97 which communicate with a suitable source of solvent 99 and which respectively communicate, through respective valves 101 and 103 (shown schematically) with the resin supply conduit 53 and the catalyst supply conduit 61. Thus, when flushing is desired, the valves 101 and 103 are opened to afford solvent flow into the resin and catalyst supply conduits 53 and 61, through the resin and catalyst mixing passage or pipe 51, through the port 71 into the annular space 73 within the sleeve 75, and into the port 85 for flow through the flushing passage 81 to the solvent recovery vessel 83.

As opposed to prior practice involving removal of the sprue and insertion of a sprue plug after filling of the mold cavity, the invention disclosed herein includes, after completion of the filling of the mold cavity 15, retention of the sprue 23 in communication with the mold cavity 15. Refrigeration of the liquid resin in the sprue 23 removes heat from the resin and catalyst mixture in the mixture passage or pipe 51, thereby lowering the thermal energy available to promote polymerization of the catalyzed resin in the sprue 23, and thereby helping to keep the heat in the mold from curing the catalyzed resin in the sprue 23. Such refrigeration thereby maintains the catalyst and resin mixture in the sprue 23 in such condition to enable continuation of the application of pressure through the catalyst and resin mixture in the sprue 23 to the catalyst and resin mixture in the mold cavity 15. Such continued application of pressure through the unpolymerized mixture in the sprue 23 to the resin undergoing at least the beginning stages of curing in the mold cavity 15 serves to avoid air entrapment otherwise commonly occurring incident to removal of the sprue and insertion of a sprue plug. Even if some curing of the resin in the sprue 23 occurs, the advantages of the invention can still be obtained so long the sprue 23 is not totally closed by curing, i.e., so long as a fluid or liquid or solid pressure path remains in the resin for the continued application of pressure through the sprue 23 and to the mold cavity 15.

In addition, the continued application of pressure during the commencement of curing of the resin in the mold cavity 15 produces sounder parts with improved surface finish.

The refrigeration or cooling of the sprue 23 is maintained during the filling of the mold cavity 15 with the resin and catalyst mixture and is continued until after at least the beginning of the curing of the resin in the mold cavity 15 to produce the finished part, i.e., until after gelling of the resinous mixture. Preferably, the refrigeration or cooling is continued until after removal of the finished part from the mold cavity 15, until after preparation of the mold 11 for the next part, and during the injection of the resin and catalyst mixture for the next part.

When the sprue 23 is displaced to the closed position, thereby cutting off pressure to the mold cavity 15, outflow of resin and catalyst mixture from the sprue 23 is prevented during removal of the finish part, during preparation of the mold cavity 15 for the next part, and until commencement of injection of resin for the next part.

Leaving the sprue 23 in communication with the mold cavity 15 (except when closed as indicated above) eliminates resinous mixture waste associated with removal and cleaning of the sprue 23 after each mold cycle as is common in prior practice.

The invention takes advantage of the known phenomena that reducing the resin temperature will slow the polymerization process and employs the refrigeration or cooling to keep the heat in the mold 11, whether generated by exotherm or other heating means, and to prevent or reduce warming and curing of the resin in the sprue 23. The temperature in the sprue 23 is maintained low enough to delay set up or curing of the resin in the sprue 23 for a period long enough to allow cure and removal of the molded part. Furthermore, the disclosed construction involves the application of cooling from the very beginning of the mixing of the catalyst with the resin as the inlet end 52 of the mixture pipe or passage 51 is located within the area encompassed by the cooling jacket 25.

Various of the features of the invention are set forth in the following claims.

I claim:

1. A method of resin transfer molding with a mixture of unpolymerized resin and catalyst and including the steps of forming a mold defining a cavity, providing a hollow sprue which is in communication with a source of pressurized unpolymerized resin and with a source of pressurized catalyst, whereby to fill the hollow sprue with the mixture, and which is operable between a closed position wherein the sprue is out of communication with the mold cavity and an open position wherein the sprue communicates with the mold cavity, operating the hollow sprue to place the hollow sprue in the open position wherein the sprue communicates with the mold cavity so as to fill the mold cavity with the mixture under pressure, refrigerating the sprue so as to delay polymerization of the resin in the sprue, maintaining the sprue in the open position to maintain a pressure path through the sprue to the mold cavity during the filling of pressurized mixture to the mold cavity, after filling the mold cavity with the pressurized mixture, and until after at least commencement of polymerization of the resin in the filled mold cavity to form a molded part, operating the sprue to the closed position, only after filling of the mold cavity and at least commencement of polymerization of the resin in the filled mold cavity, to permit removal of the molded part from the mold cavity, and maintaining the refrigeration of the sprue until at least after removal of the finished part from the mold cavity.

2. A method in accordance with claim wherein said refrigerating is maintained until after preparation of the mold cavity for another cycle, and until after another filling of the mold cavity.

3. A method in accordance with claim 1 and further including the step of mixing unpolymerized resin under pressure and catalyst under pressure to form the mixture in the sprue in a refrigerated area.

* * * * *